United States Patent
Montevirgen et al.

(10) Patent No.: US 9,001,002 B2
(45) Date of Patent: Apr. 7, 2015

(54) PORTABLE ELECTRONIC DEVICE HOUSING HAVING INSERT MOLDING AROUND ANTENNA

(75) Inventors: Anthony S. Montevirgen, San Francisco, CA (US); Emery A. Stanford, San Francisco, CA (US); Stephen B. Lynch, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 189 days.

(21) Appl. No.: 13/250,668

(22) Filed: Sep. 30, 2011

(65) Prior Publication Data

US 2013/0082883 A1    Apr. 4, 2013

(51) Int. Cl.
*H01Q 1/40* (2006.01)
*H01Q 1/24* (2006.01)
*B29C 70/68* (2006.01)

(52) U.S. Cl.
CPC .............. *H01Q 1/243* (2013.01); *B29C 70/68* (2013.01); *H01Q 1/40* (2013.01)

(58) Field of Classification Search
USPC .................................. 343/702, 700 MS, 873
See application file for complete search history.

(56) References Cited

U.S. PATENT DOCUMENTS

| | | | |
|---|---|---|---|
| 6,054,955 A | 4/2000 | Schlegel, Jr. et al. | |
| 6,307,520 B1 | 10/2001 | Lin | |
| 6,339,400 B1 | 1/2002 | Flint et al. | |
| 6,686,886 B2 | 2/2004 | Flint et al. | |
| 6,825,751 B1 * | 11/2004 | Kita et al. | 340/5.61 |
| 7,271,769 B2 | 9/2007 | Asano et al. | |
| 7,697,281 B2 * | 4/2010 | Dabov et al. | 361/679.55 |
| 7,916,089 B2 | 3/2011 | Schlub et al. | |
| 2005/0001767 A1 | 1/2005 | Wulff et al. | |
| 2006/0091398 A1 * | 5/2006 | Yamaguchi et al. | 257/72 |
| 2006/0250897 A1 * | 11/2006 | Brewer | 368/82 |
| 2007/0038516 A1 | 2/2007 | Apple | |
| 2007/0060044 A1 | 3/2007 | Lamb | |
| 2007/0283145 A1 | 12/2007 | Gressel | |
| 2008/0122705 A1 | 5/2008 | Kurashima et al. | |
| 2009/0002242 A1 | 1/2009 | Lasarov et al. | |
| 2009/0058737 A1 | 3/2009 | Tsujimura et al. | |
| 2009/0140936 A1 * | 6/2009 | Cho et al. | 343/702 |

(Continued)

FOREIGN PATENT DOCUMENTS

JP          2006048166          2/2006

OTHER PUBLICATIONS

Rappoport et al., U.S. Appl. No. 13/243,549, filed Sep. 23, 2011.

*Primary Examiner* — Sue A Purvis
*Assistant Examiner* — Hai Tran
(74) *Attorney, Agent, or Firm* — Michael H. Lyons; Joseph F. Guihan (57) ABSTRACT

Embodiments are described herein in the context of housings for electronic devices. In one embodiment, a housing can make use of an outer member, which can be formed of glass. The outer member can be secured with respect to other portions of the housing for the electronic device. The output member can also be protected at its edges by a protective side member. Still further, one or more antenna can be provided at least partially internal to the protective side member. The electronic devices can be portable and in some cases hand-held.

27 Claims, 10 Drawing Sheets

(56) References Cited

U.S. PATENT DOCUMENTS

| | | | |
|---|---|---|---|
| 2009/0168367 A1* | 7/2009 | Fujii | ............................. 361/720 |
| 2009/0174612 A1 | 7/2009 | Ayala et al. | |
| 2009/0257232 A1 | 10/2009 | Lam | |
| 2010/0073241 A1* | 3/2010 | Ayala Vazquez et al. ..... 343/702 |
| 2010/0271281 A1 | 10/2010 | Tsao et al. | |
| 2010/0277384 A1 | 11/2010 | Gierow | |
| 2010/0283706 A1 | 11/2010 | Tsao et al. | |
| 2011/0134012 A1 | 6/2011 | Yang et al. | |

\* cited by examiner

PORTABLE ELECTRONIC DEVICE HOUSING HAVING INSERT MOLDING AROUND ANTENNA

BACKGROUND

Conventionally, portable electronic devices have housings that encases the various electrical components of the portable electronic devices. Often, the portable electronic devices have a display arrangement within the housing. Many portable electronic devices also have wireless network communication capabilities. For wireless communication via a cellular telephone network, a portable electronic device operable as a mobile phone includes an antenna for the cellular telephone network. For wireless data communication using a wireless data network (e.g., 802.11, Bluetooth, etc.), a portable communication device includes an antenna for the wireless data network. Hence, the housing for the portable electronic device can thus include one or more antenna. Placement of the one or more antenna needs to be isolated from each other (if multiple antenna provided) and also positioned a minimum distance away from electrically conductive components. Accordingly, placement of antenna in portable electronic device housings becomes increasingly difficult as the portable electronic device housings become more compact.

SUMMARY

Embodiments are described herein in the context of a housing for an electronic device. The housing can make use of an outer member, which can be formed of glass. The outer member can be secured with respect to other portions of the housing for the electronic device. The output member can also be protected at its edges by a protective side member. Still further, one or more antenna can be provided at least partially internal to the protective side member. The electronic device can be portable and in some cases handheld.

According to some embodiments, an electronic device can have a housing (or enclosure) that includes at least one glass cover and a peripheral structure formed adjacent the periphery of the glass cover. The peripheral structure can be secured adjacent to the glass cover with an adhesive and/or mechanical means. One or more antenna can be provided at least partially internal to the peripheral structure. Advantageously, the one or more antenna are securely positioned, protected and shielded by the peripheral structure, while also being provided in a space efficient manner for the electronic device. The one or more antenna can also serve to provide structure components that can assist with the securing of the peripheral structure to the periphery of the glass cover or other parts of the enclosure.

The invention can be implemented in numerous ways, including as a method, system, device, or apparatus. Several embodiments of the invention are discussed below.

As an electronic device enclosure for an electronic device, one embodiment can, for example, include at least: a glass cover for an outer surface for the electronic device enclosure; at least one peripheral metal antenna provided adjacent a periphery of the glass cover; and a peripheral side protective surface for the glass cover. The peripheral side protective surface can be provided adjacent to the periphery of the glass cover and over at least a portion of the at least one peripheral metal antenna. The peripheral side protective surface can be molded about the periphery of the glass cover and molded over at least a portion of the at least one peripheral metal antenna.

As a method for assembling an electronic device, one embodiment can, for example, include at least the acts of obtaining a glass member, obtaining a peripheral metal antenna, adhering the peripheral metal antenna to a peripheral portion of the glass member, and molding a peripheral protective side portion adjacent to the peripheral portion of the glass member and over at least a portion of the peripheral metal antenna.

As a method for assembling an electronic device, another embodiment can, for example, include at least the acts of obtaining an outer housing member having a top surface and a bottom surface, where the top surface provides an outer surface for a portion of the electronic device; depositing an adhesive layer around at least select portions of a periphery of the bottom surface of the outer housing member; adhering a portion of a peripheral metal antenna member to the bottom surface of the outer housing member using at least the adhesive layer; and molding a peripheral protective side portion for the electronic device, the peripheral protective side portion being molded adjacent the periphery of the outer housing member and over the peripheral metal antenna.

Other aspects and advantages of embodiments of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

Embodiments are described herein in the context of a housing for an electronic device. The housing can make use of an outer member, which can be formed of glass. The outer member can be secured with respect to other portions of the housing for the electronic device. The output member can also be protected at its edges by a protective side member. Still further, one or more antenna can be provided at least partially internal to the protective side member. The electronic device can be portable and in some cases handheld.

According to some embodiments, an electronic device can have a housing (or enclosure) that includes at least one glass cover and a peripheral structure formed adjacent the periphery of the glass cover. The peripheral structure can be secured adjacent to the glass cover with an adhesive and/or mechanical means. One or more antenna can be provided at least partially internal to the peripheral structure. Advantageously, the one or more antenna are securely positioned, protected and shielded by the peripheral structure, while also being provided in a space efficient manner for the electronic device. The one or more antenna can also serve to provide structure components that can assist with the securing of the peripheral structure to the periphery of the glass cover or other parts of the enclosure.

The following detailed description is illustrative only, and is not intended to be in any way limiting. Other embodiments will readily suggest themselves to skilled persons having the benefit of this disclosure. Reference will now be made in detail to implementations as illustrated in the accompanying drawings. The same reference indicators will generally be used throughout the drawings and the following detailed description to refer to the same or like parts. It should be appreciated that the drawings are generally not drawn to scale, and at least some features of the drawings have been exaggerated for ease of illustration.

In the interest of clarity, not all of the routine features of the implementations described herein are shown and described. It will, of course, be appreciated that in the development/design of any such actual implementation, numerous implementation-specific decisions must be made in order to achieve the developer's/designer's specific goals, such as compliance with application and business related constraints, and that these specific goals will vary from one implementation to another and from one developer/designer to another. Moreover, it will be appreciated that such a development/design effort might be complex and time-consuming, but would nevertheless be a routine undertaking of engineering for those of ordinary skill in the art having the benefit of this disclosure.

Embodiments of the invention can relate to apparatus, systems and methods for providing a housing for an electronic device where the housing includes at least one glass member. In one example, the glass member may be an outer surface of an electronic device. The glass member may for example correspond to a glass cover that helps form part of a display area of an electronic device (i.e., situated in front of a display either as a separate part or integrated within the display. Alternatively or additionally, the glass member may form a part of the housing. For example, it may form an outer surface other than in the display area.

The housings described herein are especially suitable for small form factor electronic devices such as handheld electronic devices (e.g., mobile phones, media players, personal digital assistants, remote controls, etc.). The glass can be thin in these small form factor embodiments, such as less than 3 mm, or more particularly between 0.5 and 2.5 mm, or even more particularly between 0.3 and 1.0 mm. The housing described herein can also be used for other devices including, but not limited to including, relatively larger form factor electronic devices (e.g., portable computers, tablet computers, displays, monitors, televisions, etc.). The glass can also be thin in these larger form factor embodiments, such as less than 5 mm, or more particularly between 0.5 and 3 mm, or even more particularly between 0.3 and 2.0 mm.

Embodiments are discussed below with reference to FIGS. 1-7. However, those skilled in the art will readily appreciate that the detailed description given herein with respect to these figures is for explanatory purposes as the invention extends beyond these limited embodiments.

Figure 1:
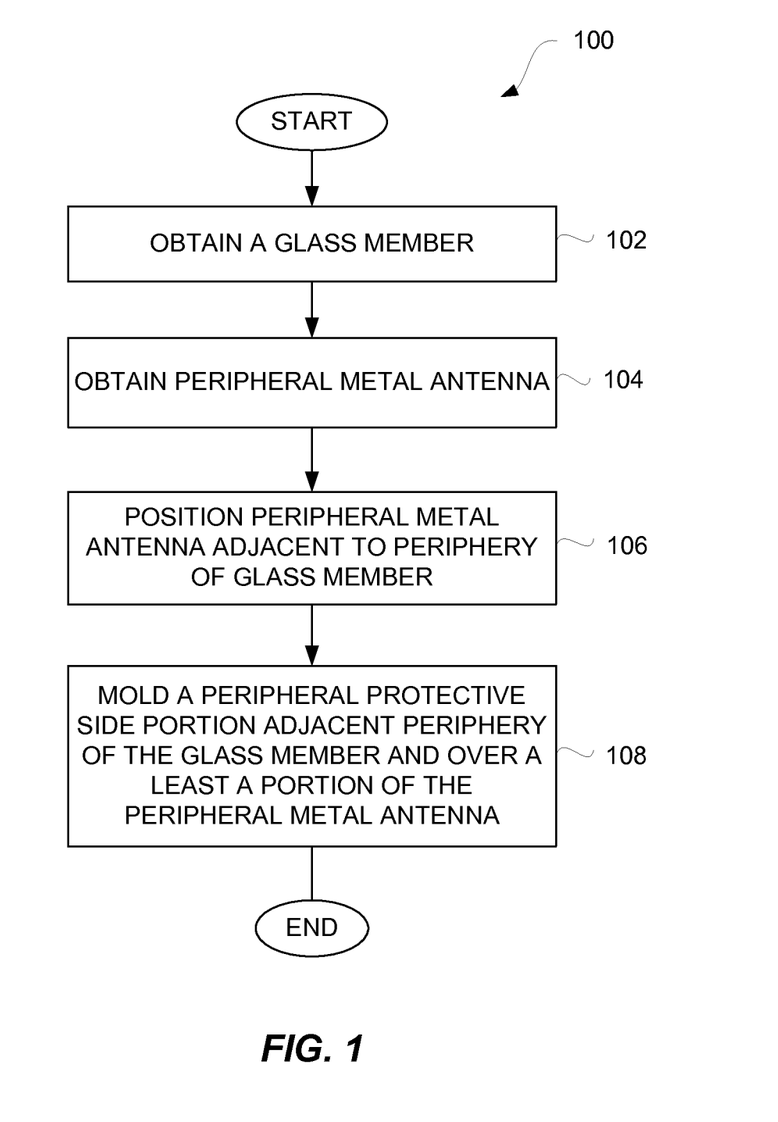
FIG. 1 is a flow diagram of a housing formation process according to one embodiment of the invention.

FIG. 1 a flow diagram of a housing formation process 100 according to one embodiment of the invention. The housing formation process 100 can operate to produce a housing for an electronic device, or at least a portion of such a housing.

The housing formation process 100 can initially obtain 102 a glass member. The glass member is to serve as a significant outer surface for the housing. For example, the glass member can correspond to a top surface for the housing. Alternatively or additionally, the glass member can correspond to a bottom surface for the housing. The glass member is typically thin, particularly when used with portable electronic devices. In one embodiment, the glass member has a thickness of less than 5 mm, or more particularly less than 1 mm.

A peripheral metal antenna is also obtained 104. The peripheral metal antenna is typically configured to be placed adjacent a periphery of the glass member. In one embodiment, the peripheral antenna has a "ring-shaped" construction that can be placed adjacent some or all of the periphery of the glass member. In one implementation, the peripheral metal antenna can be formed of sheet metal. In alternative implementations, the peripheral metal antenna can be formed of other metals, such as copper, brass and aluminum.

After the glass member and the peripheral metal antenna have been obtained, the peripheral metal antenna can be positioned 106 adjacent to the periphery of the glass member. Typically, the peripheral metal antenna would be positioned 106 and held in such position. To hold the peripheral metal antenna in position, the peripheral media antenna can be adhered adjacent to the periphery of the glass member by chemical bonding and/or mechanical structures.

After the peripheral metal antenna has been positioned 106 adjacent to the glass member, a peripheral protective side portion can be molded 108 adjacent to the periphery of the glass member and over at least a portion of the peripheral metal antenna. The peripheral protective side portion can thus shield (or cover) the peripheral metal antenna, which can be advantageous, since the peripheral metal antenna is protected and provided at an outer region of the housing for the electronic device. The peripheral protective side portion can also serve to provide a protective covering of the edges of the glass member.

Figure 2A:
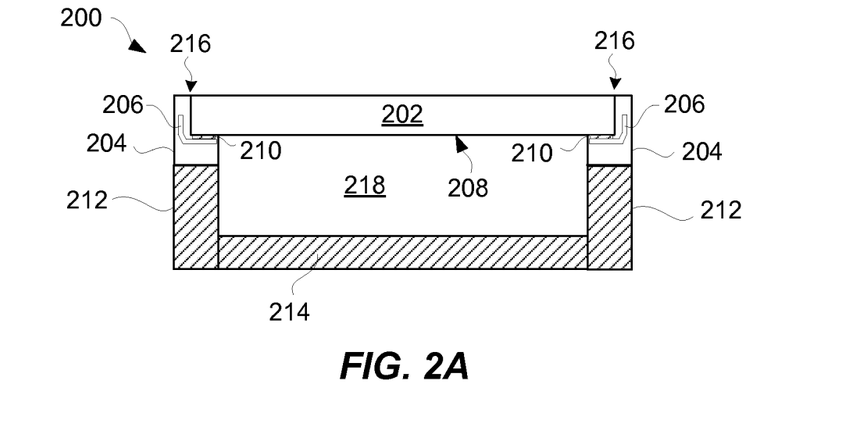
FIG. 2A is a cross-sectional view of an electronic device housing according to one embodiment.

FIG. 2A is a cross-sectional view of an electronic device housing 200 according to one embodiment. The electronic device housing 200 is a housing for an electronic device, such as a compact portable electronic device. The electronic device housing 200 includes an outer housing member 202 supported and protected by a protective side member 204. The protective side member 204 being positioned tightly adjacent sides of the outer housing member 202. The protective side member 204 can provide a thin layer of material positioned tightly adjacent sides of the outer housing member 202, thereby buffering impact at the sides of the outer housing member 202.

One or more antenna 206 can be provided within the protective side member 204. In this manner, the antenna 206 can be provided at an outer region of the electronic device housing 200 while also being protected from user interference or damage. Typically, the protective side member 204 is also opaque so that users cannot perceive the one or more antenna 206 provided within the protective side member 202. The one or more antenna 206 are used by the electronic device for wireless communications via a wireless network.

Additionally, the one or more antenna 206 can further be used to secure the outer housing member 202 to other portions of the electronic device housing 200. In one embodiment, the one or more antenna 206 can be secured to a periphery of an inner surface 208 of the outer housing member 202. For example, an adhesive 210 can be used to secure the one or more antenna 206 to the periphery of the inner surface 208 of the outer housing member 202.

The protective side member 204 can also support the outer housing member 202 and can serve to secure the outer housing member 202 to other portions of the electronic device housing 200. In one embodiment, the protective side member 204 can extend around all sides of the outer housing member 202. In another embodiment, the protective side member 204 can extend around those of the sides of the outer housing member 202 that would otherwise be exposed.

As shown in FIG. 2A, the outer housing member 202 can be secured to a support structure 212 of the electronic device housing 200. The support structure 212 can, for example, be an outer periphery member for the electronic device housing 200. In one embodiment, the support structure 212 can couple to another outer housing member 214, which can be formed differently than the outer housing member 202.

The protective side member 204 can be secured tightly adjacent the sides of the outer housing member 202 using an adhesive 208. In one embodiment, the adhesive 208 can be applied as a layer of adhesive that is provided around a periphery of an inner side of the outer housing member 202. The protective side member 204 can be molded in place so as to be tightly adjacent the sides of the outer housing member 202. By molding the protective side member 204 in place, the outer exposed interface 216 between the sides (e.g., edges) of the outer housing member 202 and the peripheral side member 204 is essentially gap-free. The protective side member 204 can also be molded around the antenna 206 secured on the periphery of the bottom side of the outer housing member 202. The antenna 206 can thus serve to secure the protective side member 204 against the sides of the outer housing member 202. Also, if the adhesive 210 is thermally activated, the molding of the protective side member 202 can also serve to activate the thermally activated adhesive 210 so that a strong bond can be provided between the outer housing member 202 and the antenna 206 via the adhesive 210.

An internal space 218 is provided internal to the electronic device housing 200 whereby various electrical components can be attached, affixed or placed so as to provide electronic operations for the electronic device.

The various members, parts or assemblies of the electronic device housing 200 can be formed of any of a variety of materials, e.g., glass, polymers or metal. In one embodiment, the outer housing member 202 is glass, the protective side member 204 is be formed from polymer (e.g., thermoplastic), the support structure 212 is formed from metal or polymer (e.g., plastic), and the another outer housing member 214 is formed from glass, polymer (e.g., plastic) or metal. More particularly, in some embodiments, the protective side member 204 can be a structurally strengthened polymer (e.g., thermoplastic). As an example, the protective side member 204 can be polymer, such as polyarylamide, nylon or polycarbonate, which can be structurally strengthened by including glass fibers. For example, some examples of some structurally strengthened polymers include 50% glass filled nylon and 30% glass filled polycarbonate.

Figure 2B:
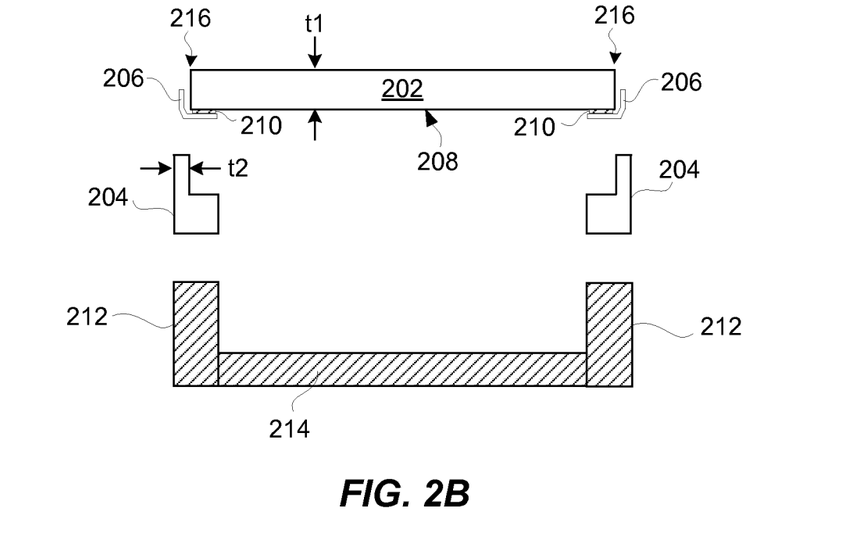
FIG. 2B is a cross-sectional assembly diagram for the electronic device housing shown in FIG. 2A, according to one embodiment.

FIG. 2B is a cross-sectional assembly diagram for the electronic device housing 200 shown in FIG. 2A, according to one embodiment. The outer housing member 202 has a top surface and a bottom surface 208. The bottom surface 208 of the outer housing member 202 has adhesive 210 applied as a layer of adhesive that is provided around a periphery of the bottom surface 208 of the outer housing member 202. The protective side member 204 can then be molded adjacent the sides of the outer housing member 202. When the protective side member 204 is molded, the protective side member 204 is also at least partially formed adjacent the adhesive 210 on the bottom surface 208 of the outer housing member. Moreover, when the protective side member 204 is formed, the protective side member 204 can also be adjacent and secured to an upper side portion of the support structure 212. When the protective side member 204 are provided at the sides (i.e., edges) of the outer housing member 202, the protective side member 204 provides a buffer layer (e.g., bumper) that dampens impact induced at the sides of the outer housing member 202 of the electronic device housing 200.

In FIGS. 2A and 2B, the protective side member (e.g., protective side bumpers) is a thin layer of material positioned tightly adjacent one or more sides of the outer housing member, thereby buffering impact at the sides of the outer housing members. The protective side member can represent a single structure or a multi-part structure. In one embodiment, the protective side member is to be strong; hence, a structurally strengthened polymer, such as polyarylamide, can be utilized. The polyarylamide can be strengthened by containing glass fibers. One source of strengthened polyarylamide is IXEF polyarylamide (PARA) from Solvay Advanced Polymers, L.L.C which can contain glass fiber reinforcement. Additionally, since the protective side member are tightly adjacent sides of the outer housing member, the respective materials used for the protective side member and the outer housing member. Specifically, the Coefficient of Thermal Expansion (CTE) of the respective materials, if not controlled, can produce undesired stress on the sides of the outer housing member. For example, with an outer housing member of glass, its CTE is about 10 millimeters/meter/° C. Hence, ideally, for this example the CTE of the material for the protective side member would be about 10 millimeters/meter/° C. Although plastics tend to have CTE's (e.g., roughly 100 millimeters/meter/° C.) that are dramatically higher than that of glass, some manufactured polymers, such as polyarylamide, can have CTE's (e.g., roughly 30 millimeters/meter/° C.) that are substantially closer to that of glass and thereby would, if used, induce less stress on the sides of the outer housing member. For example, in one embodiment, a manufactured polymer for such use could have a CTE less than or equal to about 50 millimeters/meter/° C., and in another embodiment, a manufactured polymer for such use could have a CTE less than or equal to about 35 millimeters/meter/° C. Also, as noted above, the thickness of the protective side member can be thin, for example, the thickness can be not more than about 1 mm in one embodiment.

In still other embodiments, the protective side material can be formed from multiple materials that can be alternated, intertwined or layered. The later of material against the edges of the outer housing member of glass can have a CTE relatively close to that of glass while an outer layer can have a higher CTE can permit a greater range of material, such as polymers (e.g., plastics).

The protective side member is able to be thin yet be cosmetically unintrusive. For example, in some embodiments, the thickness (t1) for the protective side member can be less than 1 mm (e.g., 0.8 mm). Also, in some embodiments, the thickness (t2) of the outer housing member can be less than 5 mm (e.g., 1 mm). However, these thicknesses are exemplary and vary with the size of the electronic device housing and with desired strength. Using a strengthened material for the protective side member as noted above can also be advantageous. Nevertheless, the provisioning of thin protective side member for outer housing members, such as glass covers, facilitates providing portable electronic device housings that are compact and thin yet resistant to side impact damage to the outer housing members.

Figure 3A:
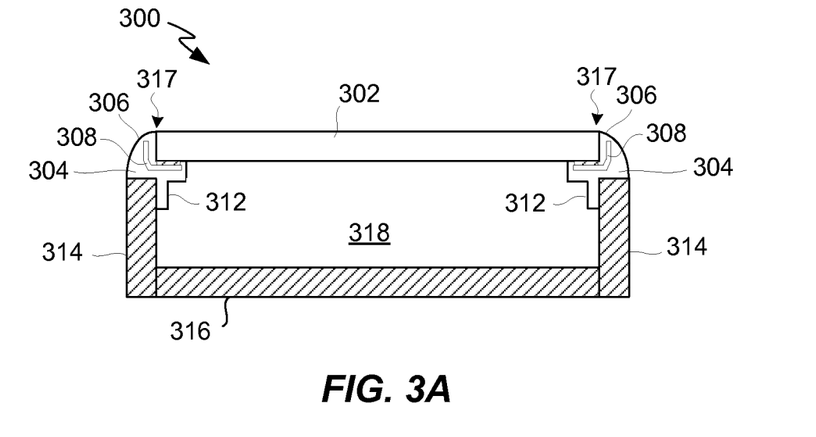
FIG. 3A is a cross-sectional view of an electronic device housing according to another embodiment.
Figure 3B:
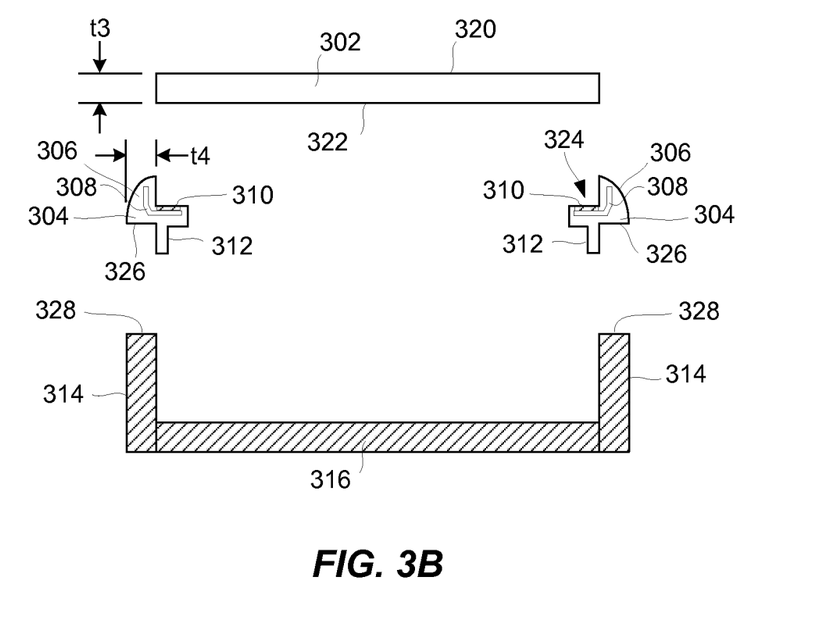
FIG. 3B is a cross-sectional assembly diagram for the electronic device housing shown in FIG. 3A, according to one embodiment.

FIGS. 3A and 3B are structurally similar to FIGS. 2A and 2B, respectively. However, the configuration of the protective side member is different. The protective side member illustrated in FIGS. 3A and 3B form corners for the electronic device housing and, therefore, are typically thicker than the protective side member illustrated in FIGS. 2A and 2B. As an example, in one embodiment, the thickness of the protective side member is approximately the thickness of the outer housing member.

FIG. 3A is a cross-sectional view of an electronic device housing 300 according to another embodiment. The electronic device housing 300 is a housing for an electronic device, such as a compact portable electronic device. The electronic device housing 300 includes an outer housing member 302 supported and protected by an interface member 304 having a protective side member 306 (e.g., protective side bumpers). The protective side member 306 can be positioned tightly adjacent sides of the outer housing member 302. The protective side member 306 can provide a thin layer of material positioned tightly adjacent sides of the outer housing member 302, thereby buffering impact at the sides of the outer housing member 302.

One or more antenna 308 can be provided within the protective side member 306. In this manner, the antenna 308 can be provided at an outer region of the electronic device housing 300 while also being protected from user interference or damage. Typically, the protective side member 306 is also opaque so that users cannot perceive the one or more antenna 308 provided within the protective side member 306. The one or more antenna 308 are used by the electronic device for wireless communications via a wireless network.

Additionally, the one or more antenna 308 can further be used to secure the outer housing member 302 to other portions of the electronic device housing 300. In one embodiment, the one or more antenna 308 can be secured to a periphery of an inner surface 322 of the outer housing member 302. For example, an adhesive 310 can be used to secure the one or more antenna 308 to the periphery of the inner surface 322 of the outer housing member 302.

The protective side member 306 can also support the outer housing member 302 and can serve to secure the outer housing member 302 to other portions of the electronic device housing 300. In one embodiment, the protective side member 306 can extend around all sides of the outer housing member 302. In another embodiment, the protective side member 306 can extend around those of the sides of the outer housing member 302 that would otherwise be exposed.

The protective side member 306 can be molded in place so as to be tightly adjacent the sides of the outer housing member 302. By molding the protective side member 306 in place, an outer exposed interface 317 between the sides (e.g., edges) of the outer housing member 302 and the peripheral side member 306 can be essentially gap-free. The protective side member 306 can also be molded around the antenna 308 secured on the periphery of the bottom side of the outer housing member 302. The antenna 308 can thus serve to secure the protective side member 306 against the sides of the outer housing member 302. Also, if the adhesive 310 is thermally activated, the molding of the protective side member 306 can also serve to activate the thermally activated adhesive 310 so that a strong bond can be provided between the outer housing member 302 and the antenna 308 via the adhesive 310.

In this embodiment, the interface member 304 is secured to an outer periphery member 314. More particularly, in this embodiment, the interface member 304 includes securing features 312 (e.g., attachment arms) that are used to secure the interface member 304 (and thus the outer housing member 302) to the outer periphery member 314. The electronic device housing 300 can also include another outer housing member 316. The another outer housing member 316 can, for example, be integral with or secured to the outer periphery member 314 on a side opposite the outer housing member 302. An internal space 318 is provided internal to the electronic device housing 300 whereby various electrical components can be attached, affixed or placed so as to provide electronic operations for the electronic device.

The various members, parts or assemblies of the portable electronic device 300 can be formed of any of a variety of materials, e.g., glass, polymer or metal. In one embodiment, the outer housing member 302 is glass, the outer periphery member 314 is formed from metal or polymer (e.g., plastic), and the another outer housing member 316 is formed from glass, polymer (e.g., plastic) or metal. The interface member 304 can be formed of a polymer or from a combination of materials. For example, the protective side member 306 are to be strong; hence, a structurally strengthened polymer, such as polyarylamide, can be utilized. The polyarylamide can be strengthened by containing glass fibers. Also, as an example, the securing features 312 can be formed from metal for increased strength. The securing features 312 if formed of metal can be combined with the balance of the interface member 304 by an over-molding process.

FIG. 3B is a cross-sectional assembly diagram for the electronic device housing 300 shown in FIG. 3A, according to one embodiment. The outer housing member 302 has a top surface 320 and a bottom surface 322. The bottom surface 322 of the outer housing member 302 can be secured to a top surface 324 of the interface member 304. For example, the outer housing member 302 can be secured to the top surface 324 of the interface member 304 using adhesive. Typically, the interface member 304 is provided adjacent only the peripheral portions of two or more sides of the outer housing member 302. When the outer housing member 302 is secured to the interface member 304, the protective side member 306 is positioned at the sides (i.e., edges) of the outer housing member 302. The protective side member 306 provides a buffer layer (e.g., bumper) that dampens impact induced at the sides (e.g., edges) of the outer housing member 302 of the electronic device housing 300. In addition, a bottom surface 326 of the interface member 304 can be secured adjacent a top surface 328 of the outer periphery member 314. The securing features 312 of the interface member 304 can be used to secure the interface member 304 to the outer periphery member 314.

In FIGS. 3A and 3B, the protective side member 306 (e.g., protective side bumpers) is a thin layer of material positioned tightly adjacent one or more sides of the outer housing member 302, thereby buffering impact at the sides of the outer housing members. The protective side member can represent a single structure or a multi-part structure. In these embodiments, the protective side member 306 is rounded at corners of the electronic device housing 300. For example, in some embodiments, the thickness (t3) for the protective side member 306 can be less than 5 mm (e.g., 1 mm). Also, in some embodiments, the thickness (t4) of the outer housing member 392 can be less than 5 mm (e.g., 1 mm). However, these thicknesses are exemplary and vary with the size of the electronic device housing and with desired strength. Using a strengthened material for the protective side member as noted above can also be advantageous. Nevertheless, the provisioning of thin protective side members for outer housing members, such as glass covers, facilitates providing portable electronic device housings that are compact and thin yet resistant to side impact damage to the outer housing members.

In one embodiment, the first outer housing member 301 can represent a top outer surface for the portable electronic device, and the second outer surface housing 326 can represent a bottom outer surface housing. In one embodiment, both the first outer housing member 301 and the second outer housing member 326 are glass (e.g., glass covers).

Although the edges of the outer housing members (201, 226, 301, 326) can be square as suggested by FIGS. 2A-3B, it should understood that the edges of the outer housing member need not be square but can be formed with other geometries, such as with chamfered (or flattened) edges or rounded edges. Different embodiments can thus have different edge geometries for the outer device housing.

The protective side member discussed above is typically a thin layer of material positioned tightly adjacent sides of the outer housing member, thereby buffering impact at the sides of the outer housing member. In one embodiment, the protective side member are to be strong; hence, a structurally strengthened polymer, such as polyarylamide, can be utilized. The polyarylamide can be strengthened by containing glass fibers. One source of strengthened polyarylamide is IXEF polyarylamide (PARA) from Solvay Advanced Polymers, L.L.C which can contain glass fiber reinforcement.

Additionally, since the protective side member is tightly adjacent sides of the outer housing member, the respective materials used for the protective side member and the outer housing member. Specifically, the Coefficient of Thermal Expansion (CTE) of the respective materials, if not controlled, can produce undesired stress on the sides of the outer housing member. For example, with an outer housing member of glass, its CTE is about 10 millimeters/meter/° C. Hence, ideally, for this example the CTE of the material for the protective side member would be about 10 millimeters/meter/° C. Although plastics tend to have CTE's (e.g., roughly 100 millimeters/meter/° C.) that are dramatically higher than that of glass, some manufactured polymers, such as polyarylamide, can have CTE's (e.g., roughly 30 millimeters/meter/° C.) that are substantially closer to that of glass and thereby would, if used, induce less stress on the sides of the outer housing member. For example, in one embodiment, a manufactured polymer for such use could have a CTE less than or equal to about 50 millimeters/meter/° C., and in another embodiment, a manufactured polymer for such use could have a CTE less than or equal to about 35 millimeters/meter/° C. In one implementation, additive can be added to a polymer so to bring is CTE closer to that of glass. As examples, the additives can be particles or fibers which can be formed from glass or ceramic. Also, as noted above, the thickness of the protective side member can be thin, for example, the thickness can be on the order of about 1 mm or less in one embodiment.

In still other embodiments, the protective side material can be formed from multiple materials that can be alternated, intertwined or layered. The later of material against the edges of the outer housing member of glass can have a CTE relatively close to that of glass while an outer layer can have a higher CTE can permit a greater range of material, such as polymers (e.g., plastics).

The protective side member is able to be thin yet cosmetically unintrusive. For example, in some embodiments, the thickness (t1) for the protective side member can be less than 1 mm (e.g., 0.8 mm). Also, in some embodiments, the thickness (t2) of the outer housing member can be less than 5 mm (e.g., 1 mm). However, these thicknesses are exemplary and vary with the size of the electronic device housing and with desired strength. Using a strengthened material for the protective side member as noted above can also be advantageous. Nevertheless, the provisioning of thin protective side member for outer housing members, such as glass covers, facilitates providing portable electronic device housings that are compact and thin yet resistant to side impact damage to the outer housing members.

Figure 4:
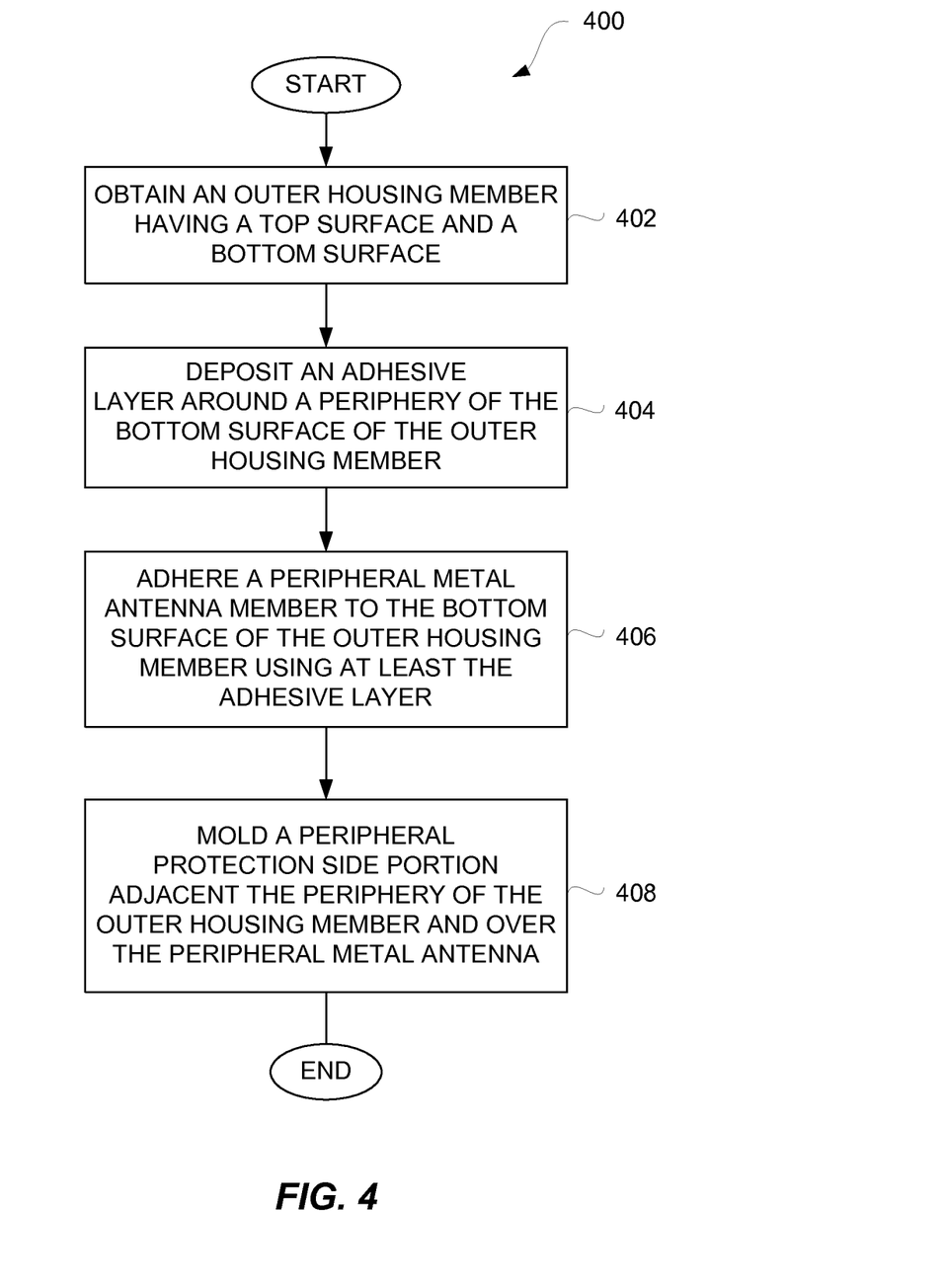
FIG. 4 a flow diagram of a housing formation process according to one embodiment of the invention.

FIG. 4 a flow diagram of a housing formation process 400 according to one embodiment of the invention. The housing formation process 400 can operate to produce a housing for an electronic device, or at least a portion of such a housing.

The housing formation process 400 can initially obtain 402 an outer housing member having a top surface and a bottom surface. The top surface of the outer housing member can correspond to a top surface for the housing. Typically, the outer housing member serves as a significant outer surface for the housing, such as substantially all of the top surface of the housing. Alternatively or additionally, the outer housing member can correspond to a bottom surface for the housing. The outer housing member is typically thin, particularly when used with portable electronic devices. In one embodiment, the outer housing member has a thickness of less than 5 mm, or more particularly less than 1 mm. In one embodiment, the outer housing member is transparent and formed of glass or a polymer.

After the outer housing member has been obtained 402, an adhesive layer can be deposited around at least a portion of a periphery of the bottom surface of the outer housing member. The adhesive can be deposited 404 around a periphery of a bottom surface of the outer housing member. The outer housing member has a top surface that can represent an outer surface for the housing, and a bottom surface that is an inner surface that is not exposed. In one embodiment, the adhesive being deposited 404 can be a thermally activated adhesive. The adhesive can, for example, by provided as film or as a layer. Also, the manner by which the adhesive is deposited can vary. In one implementation, the adhesive can be deposited 404 by forming a ring-like pattern of adhesive that can be placed (continuously or discontinuously) around the periphery of the bottom surface of the outer housing member. In another implementation, the adhesive can be screen printed onto the periphery of the bottom surface of the outer housing member.

Next, a peripheral metal antenna member can be adhered 406 to the outer housing member using the adhesive layer. Specifically, the peripheral metal antenna member can be adhered 406 adjacent the bottom surface of the outer housing member. The peripheral metal antenna member is typically configured to be placed adjacent a periphery of the outer housing member. In one embodiment, the peripheral metal antenna member has a "ring-shaped" construction that can be placed adjacent some or all of the periphery of the glass member. In one implementation, the peripheral metal antenna member can be formed of sheet metal. In alternative implementations, the peripheral metal antenna member can be formed of other metals, such as copper, brass and aluminum.

After the peripheral metal antenna member has been adhered 406 adjacent to the outer housing member, a peripheral protective side portion can be molded 408 adjacent to the periphery of the outer housing member and over at least a portion of the peripheral metal antenna member. The peripheral protection side portion can thus shield (or cover) the peripheral metal antenna member, which can be advantageous, since the peripheral metal antenna member is protected and provided at an outer region of the housing for the electronic device. The peripheral protective side portion can also serve to provide a protective covering of the edges of the outer housing member.

Typically, the peripheral metal antenna member would be positioned and held in such position by the adhesive layer. To hold the peripheral metal antenna member in position, the peripheral media antenna member can be adhered adjacent to the periphery of the outer housing member by chemical bonding (e.g., adhesive) and/or mechanical structures (e.g., features of the antenna).

Typically, the peripheral protective side portion would also be secured to the support structure by chemical bonding and/or mechanical features (e.g., undercuts or interlocks). In such case, the outer housing member and the peripheral protective side portion are secured to the support structure and thus form at least a portion of the housing for the electronic device. Also, if the adhesive is thermally activated, the molding 408 can also serve to activate the thermally activated adhesive so that a strong bond can be provided to the outer housing member and the peripheral protective side portion and/or the peripheral metal antenna member.

FIGS. 5A-5D are diagrams illustrating of an outer housing assembly according to one embodiment.

Figure 5A:
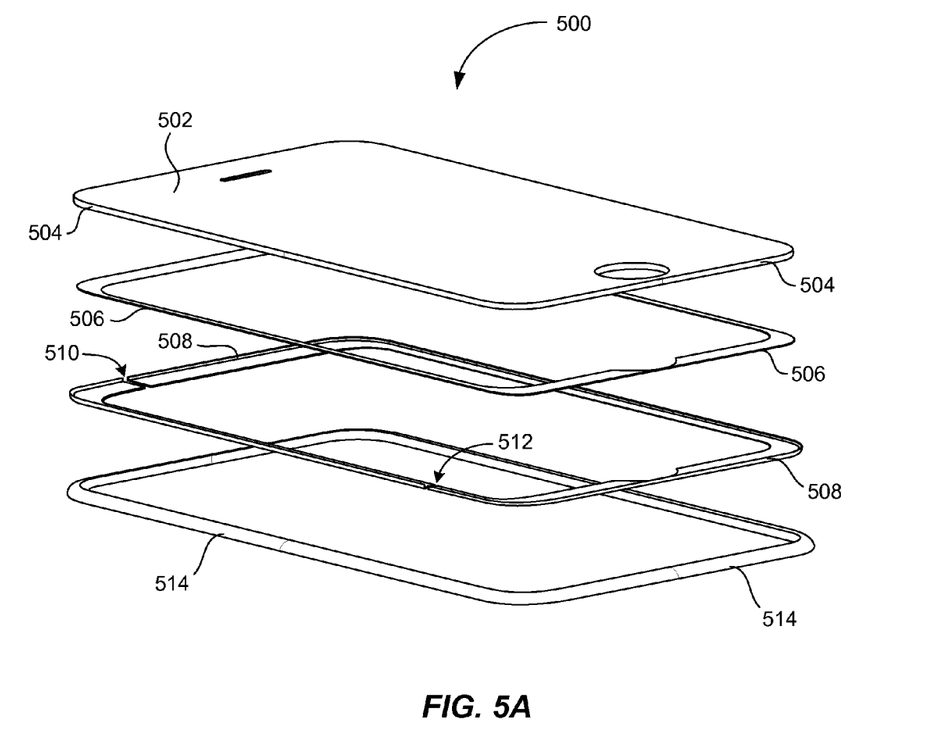
FIGS. 5A-5D are diagrams illustrating of an outer housing assembly according to one embodiment.

FIG. 5A is a perspective assembly diagram of an outer housing assembly 500. As shown in FIG. 5A, an outer housing member 502 provides an outer surface for the outer housing assembly 500. The outer housing member 502 is, for example, a glass member that provides a transparent surface through which internal electrical components, such as a display screen, can be viewed through the glass member. The outer housing member 502 is generally a thin sheet of material, such as glass or polymer, which is provided to serve as a portion of an outer surface for an electronic device housing. The outer housing member 502 has edges 504.

The backside (or internal side) of the outer housing member 500 can have an adhesive layer 506 applied thereto. The adhesive layer 506 as shown in FIG. 5A is a "ring-shaped" layer that is designed to extend around the periphery of the outer housing member 502. However, it should be recognized that the adhesive layer 516 need not be a continuous layer but can be isolated or discrete instances of adhesive applied around the periphery of the backside (or internal side) of the outer housing member 502.

Additionally, the outer housing assembly 500 includes an antenna 508 that can be secured to the backside of the outer periphery of the outer housing member 502 by way of the adhesive layer 506. The antenna 508 is an electrically conductive material, such as sheet metal, aluminum, copper, brass and the like. The antenna 508 can extend around the entire periphery of the outer housing member 502 as illustrated in FIG. 5A. However, it is not necessary that the antenna 508 extend around the entire periphery of the outer housing member 502. It should also be noted that, as illustrated in FIG. 5A, the antenna 508 can include one or more gaps 510 and 512 (or separation points) that serve to electrically separate portions of the antenna 508 so as to provide the desired antenna characteristics. Indeed, the antenna 508 formed around the periphery of the outer housing member 502 can serve to provide a plurality of distinct antenna.

Still further, the outer housing member 500 can include a molded protective side portion 514 that can be molded around the edges 504 of the outer housing member 502 as well as over at least a portion of the antenna 508. The molded protective side portion 514 can serve to provide a protective buffer for the edges 504 of the outer housing member 502. Additionally, the molded protective side portion 514 can further be secure adjacent to the edges 504 of the outer housing member 502 by the adhesive layer 506 and/or the antenna 508.

Although the antenna 508 can include gaps 510 and 512 as shown in FIG. 5A, these gaps can be initially connected during assembly to provide the antenna as a unitary structure. For example, the antenna can be formed by stamping process to form a unitary ring-shaped antenna. Then, once adhered to the outer housing member 502, the gaps 510 and 512 can be opened (or disconnected) so as to provide electrical isolation of the different antenna components (or parts).

Figure 5B:
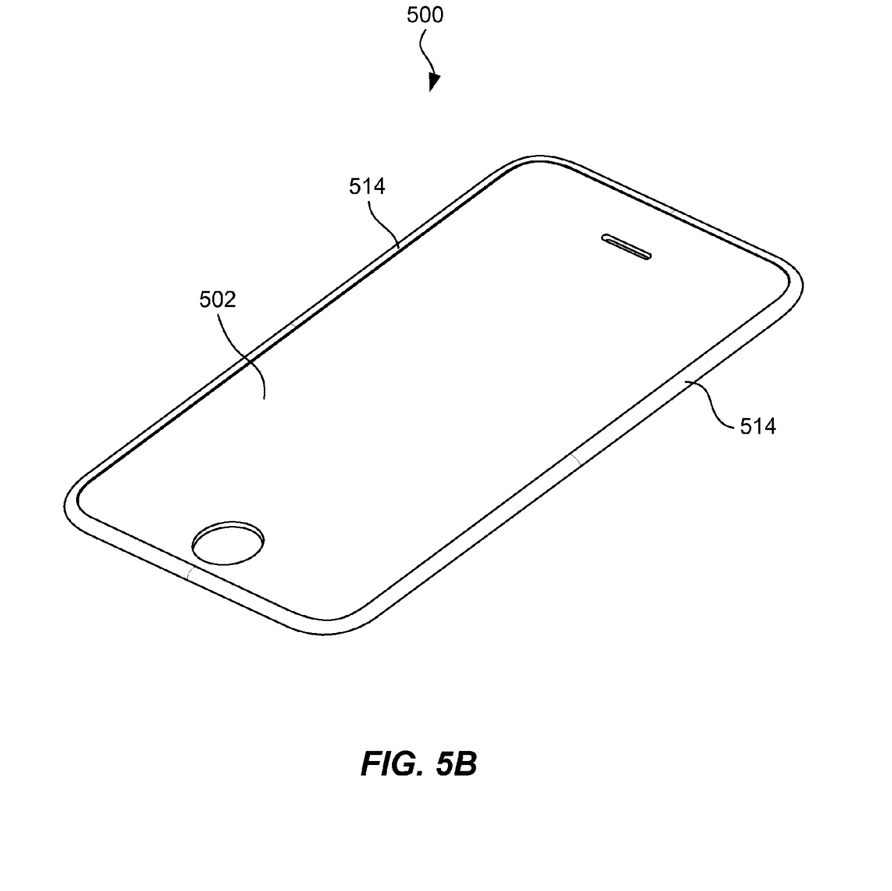

FIG. 5B illustrates an outer perspective top view of the outer housing member 500. The outer perspective top view shown in FIG. 5A illustrates the outer housing assembly 500 as assembled. The outer housing assembly 500, when assembled, includes the outer housing member 502 with the molded protective side portions 514 formed around its outer periphery. The molded protective side portions 514 can be secured to the outer housing member 502 by way of at least a portion of one or both of the adhesive layer 506 and the antenna 508.

Figure 5C:
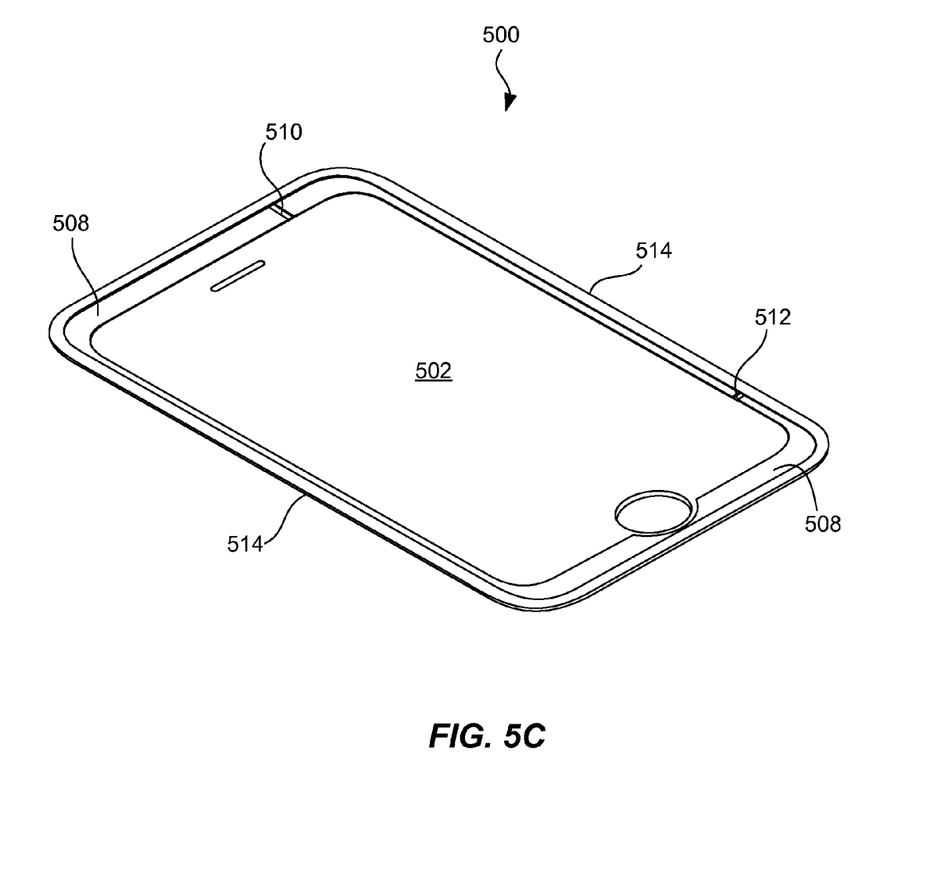

FIG. 5C illustrates an inner perspective top view for the outer housing assembly 500. The outer housing assembly 500, as shown in FIG. 5C, illustrates the outer housing member 502 from a bottom (or inside) surface having the antenna 508 coupled to its backside (or inside surface). The antenna 508 extends around the periphery of the outer housing member 502 and is secured thereto by at least a portion of the adhesive layer 506. The molded protective side portion 512 is also molded around the periphery of the outer housing member 502. The molded protective side portion 512 can also be partially molded over the antenna 508. As a result, the antenna 508 serves to secure the molded protective side portion 512 to the edges 504 of the outer housing member 502. In addition, the antenna 508 can be securely provided at the periphery of the outer housing member 502 which serves to provide an antenna at an outer region of an electronic device housing that is used for wireless communication. The antenna 508 can also include gaps (or separations) 510 and 512 as appropriate for the desired antenna characteristics.

Figure 5D:
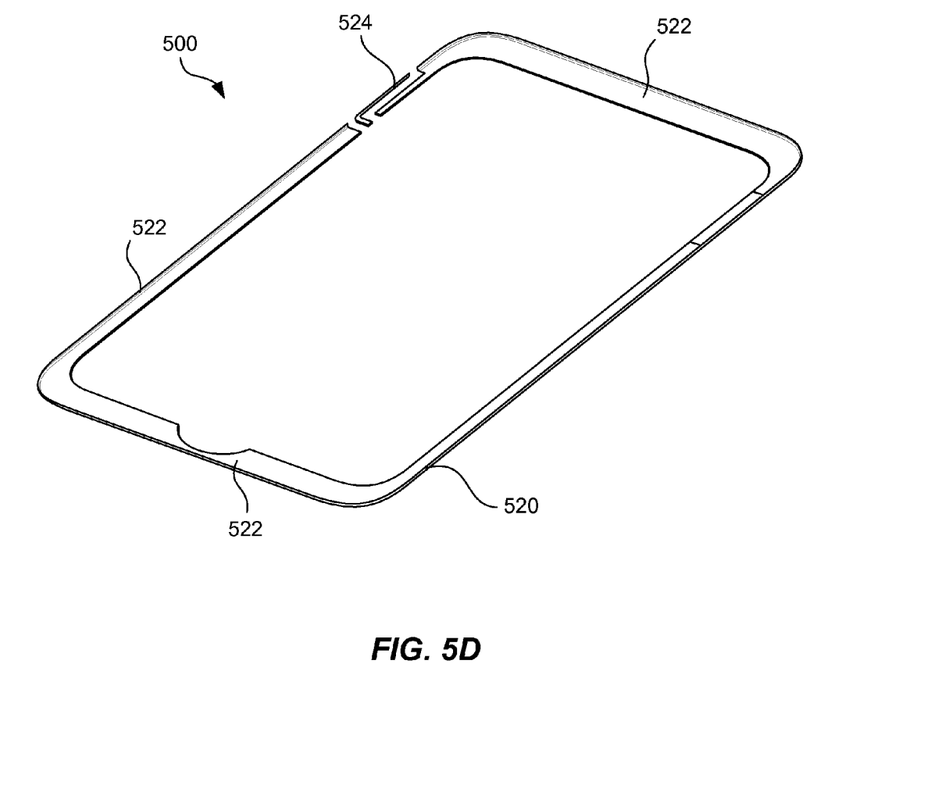

FIG. 5D illustrates an antenna 520 according to one embodiment. The antenna 520 is a ring-shaped structure that is suitable for use in a similar manner as is the antenna 508 illustrated in FIGS. 5A-5C. However, in this embodiment, the antenna 520 specifically includes a first antenna and a second antenna. The first antenna and the second antenna are separate (or electrically isolated) from one another. The first antenna uses the first portions 522 of the antenna 520 for wireless communications such as with a cellular network. The second antenna uses a second portion 524 of the antenna 520 short-range wireless communications, such as Bluetooth or 802.11.

FIGS. 6A-6F are partial cross-sectional views of antenna configurations according to certain embodiments. The antenna configurations can be formed of metal.

Figure 6A:
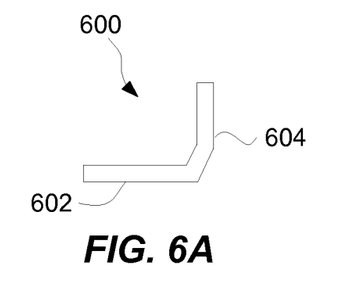
FIGS. 6A-6F are partial cross-sectional views of antenna configurations according to certain embodiments.

FIG. 6A illustrates an antenna configuration 600 that provides a bottom portion 602 and an edge portion 604. The bottom portion 602 can be secured to an outer housing member, and the edge portion 604 can be provided adjacent the edge of the outer housing member (and within a protective side member). The antenna configuration 600 is the same or similar to the antenna 206 illustrated in FIG. 2A.

Figure 6B:
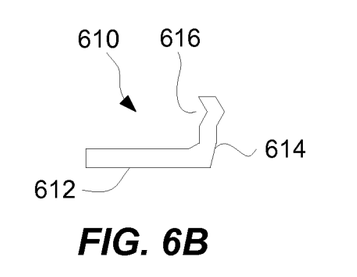

FIG. 6B illustrates an antenna configuration 610 that provides a bottom portion 612 and an edge portion 614. The bottom portion 612 can be secured to an outer housing member, and the edge portion 614 can be provided adjacent the edge of the outer housing member (and within a protective side member). The edge portion 614 includes at least one ridge 616. When the protective side member is molded around the at least one ridge 616, the at least one ridge 616 can serve to assist in securing (e.g., binding) the protective side member to the outer housing member or, more generally, the electronic device housing.

Figure 6C:
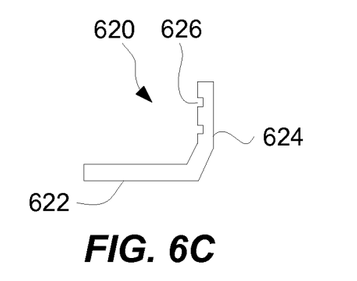

FIG. 6C illustrates an antenna configuration 620 that provides a bottom portion 622 and an edge portion 624. The bottom portion 622 can be secured to an outer housing member, and the edge portion 624 can be provided adjacent the edge of the outer housing member (and within a protective side member). The edge portion 624 includes at least one notch 626. When the protective side member is molded around the at least one notch 626, the at least one notch 626 can serve to assist in securing (e.g., binding) the protective side member to the outer housing member or, more generally, the electronic device housing.

Figure 6D:
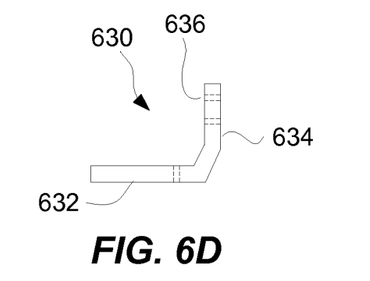

FIG. 6D illustrates an antenna configuration 630 that provides a bottom portion 632 and an edge portion 634. The bottom portion 632 can be secured to an outer housing member, and the edge portion 634 can be provided adjacent the edge of the outer housing member (and within a protective side member). The edge portion 634 includes at least one opening 636. When the protective side member is molded around the at least one opening 636, the at least one opening 636 can serve to assist in securing (e.g., binding) the protective side member to the outer housing member or, more generally, the electronic device housing.

Figure 6E:
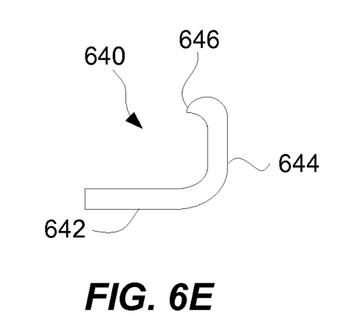

FIG. 6E illustrates an antenna configuration 640 that provides a bottom portion 642 and an edge portion 644. The bottom portion 642 can be secured to an outer housing member, and the edge portion 644 can be provided adjacent the edge of the outer housing member (and within a protective side member). The edge portion 644 includes at least one hook 646. When the protective side member is molded around the at least one hook 646, the at least one hook 646 can serve to assist in securing (e.g., binding) the protective side member to the outer housing member or, more generally, the electronic device housing.

Figure 6F:
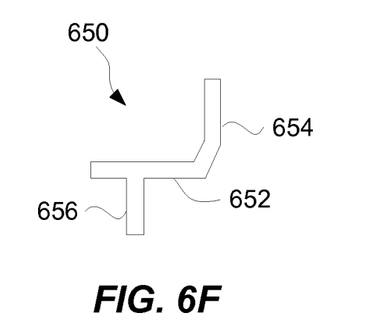

FIG. 6F illustrates an antenna configuration 650 that provides a bottom portion 652 and an edge portion 654. The bottom portion 652 can be secured to an outer housing member, and the edge portion 654 can be provided adjacent the edge of the outer housing member (and within a protective side member). The antenna configuration 650 can also include an attachment member 656 (e.g., tab) that facilitates attachment of the antenna configuration 650 to other portions (e.g., support structure 212) of the electronic device housing. The antenna configuration 650 is similar to the antenna 206 illustrated in FIG. 2A except for the additional attachment member 656.

Figure 7:
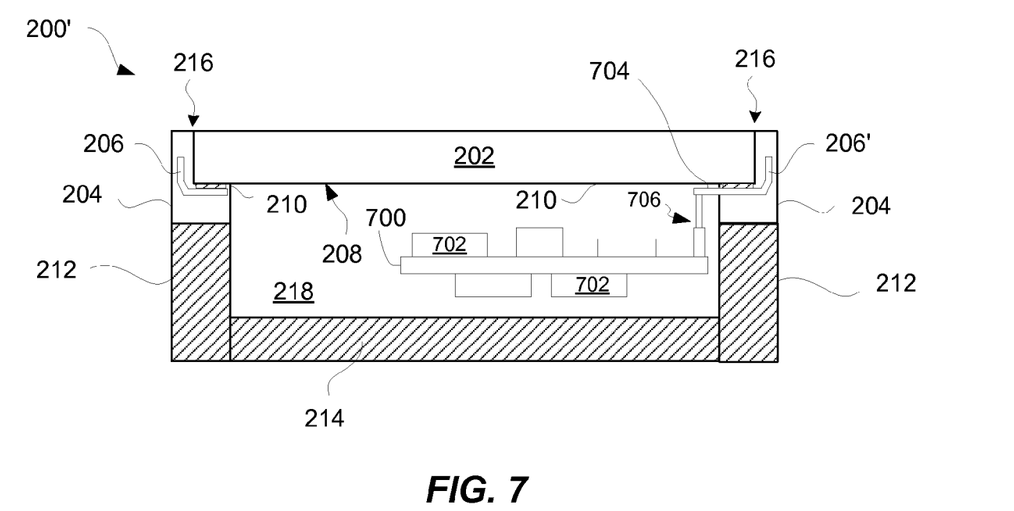
FIG. 7 is a cross-sectional view of an electronic device housing according to another embodiment.

FIG. 7 is a cross-sectional view of an electronic device housing 200' according to another embodiment. The electronic device housing 200' is a housing for an electronic device, such as a compact portable electronic device. The electronic device housing 200' is generally similar to the electronic device housing 200. The electronic device housing 200' illustrated in FIG. 7, however, further illustrates an electronic substrate 700 (e.g., printed circuit board or flex circuit) within the internal space 218. A plurality of electrical components 702 (e.g., integrated circuits, electronic components, etc.) are attached to the electronic substrate 700. In addition, an antenna 206' can be provided and can be similar to the antenna 206 discussed above regarding FIG. 2A; however, the antenna 206' includes an extended internal member 706. A connector 706 or other electrically conductive component can electrically connect the extended internal member 706 of the antenna 206' to the electronic substrate 700. The connector 706 can be secured to the electronic substrate 700 and/or the extended internal member 706, such as with adhesive, solder or other attachment mechanisms. Alternatively, the connector 706 can be biased against the electronic substrate 700 and/or the extended internal member 706, such as with a spring-biased pin.

Additional details on electronic device housings using side protective members, outer housing members (e.g., glass members) and/or insert molding are contained in: (i) U.S. application Ser. No. 12/794,563, filed Jun. 4, 2010, and entitled "Offset Control for Aseemblying An Electronic Device Housing," which is hereby incorporated herein by reference; (ii) U.S. application Ser. No. 12/895,822, filed Sep. 30, 2010, and entitled "Insert Molded Device Housings for Portable Electronic Devices," which is hereby incorporated herein by reference; (iii) U.S. application Ser. No. 12/944,671, filed Nov. 11, 2010, and entitled "Insert Molding Around Glass Members for Portable Electronic Devices," which is hereby incorporated herein by reference; (iv) U.S. application Ser. No. 13/246,707, filed concurrently, and entitled "Housing for Portable Electronic Device with Reduced Border Region," which is hereby incorporated herein by reference; and (v) U.S. application Ser. No. 13/246,697, filed concurrently, and entitled "Housing for Portable Electronic Device with Reduced Border Region," which is hereby incorporated herein by reference.

In general, the steps associated with the methods of the present invention may vary widely. Steps may be added, removed, altered, combined, and reordered without departing from the spirit or the scope of the present invention.

The various aspects, features, embodiments or implementations of the invention described above may be used alone or in various combinations.

While this specification contains many specifics, these should not be construed as limitations on the scope of the disclosure or of what may be claimed, but rather as descriptions of features specific to particular embodiment of the disclosure. Certain features that are described in the context of separate embodiments may also be implemented in combination. Conversely, various features that are described in the context of a single embodiment may also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

While embodiments and applications have been shown and described, it would be apparent to those skilled in the art having the benefit of this disclosure that many more modifications than mentioned above are possible without departing from the inventive concepts herein.

What is claimed is:

1. An electronic device enclosure for an electronic device, comprising:
    a glass cover for an outer surface for the electronic device enclosure;
    at least one peripheral metal antenna formed adjacent to a periphery of the glass cover; and
    a peripheral side protective member for the glass cover, wherein the peripheral side protective member comprises polymer and is formed adjacent to the periphery of the glass cover and over at least a portion of the at least one peripheral metal antenna, the peripheral side protective member is molded about the periphery of the glass cover and molded over at least a portion of the at least one peripheral metal antenna, the portion of the at least one peripheral metal antenna is completely surrounded by and in direct contact with the peripheral side protective member, and the at least one peripheral metal antenna is embedded within the peripheral side protective member.

2. The electronic device enclosure defined in claim 1, wherein the at least one peripheral metal antenna is at least partially secured to the glass cover by an adhesive.

3. The electronic device enclosure defined in claim 2, wherein the adhesive is deposited at a periphery of the glass cover between the glass cover and the at least one peripheral metal antenna.

4. The electronic device enclosure defined in claim 3, wherein the adhesive is deposited on a bottom surface of the glass cover, and wherein a portion of the at least one peripheral metal antenna is formed over the bottom surface and is secured to the glass cover via the adhesive.

5. The electronic device enclosure defined in claim 1, wherein the at least one peripheral metal antenna comprises a plurality of separate metal pieces.

6. The electronic device enclosure defined in claim 1, wherein the peripheral side protective member comprises a polymer.

7. The electronic device enclosure defined in claim 1, wherein the peripheral side protective member comprises a polymer strengthened by glass fibers.

8. The electronic device enclosure defined in claim 1, wherein the peripheral side protective member comprises a polymer and wherein the polymer includes additives such that the Coefficient of Thermal Expansion (CTE) of the peripheral side protective member is made closer to the CTE of the glass cover.

9. The electronic device enclosure defined in claim 8, wherein the additives comprise particles or fibers made from glass or ceramic.

10. The electronic device enclosure defined in claim 1, wherein the thickness of the glass cover is between 0.3 and 1.0 mm.

11. The electronic device enclosure defined in claim 1, wherein the electronic device enclosure further comprises a support structure and wherein the peripheral side protective member is formed adjacent to the support structure.

12. The electronic device enclosure defined in claim 11, wherein the at least one peripheral metal antenna has at least one feature that provides a mechanical interlock with the peripheral side protective member after the peripheral side protective member has been molded, wherein the at least one feature that provides the mechanical interlock is selected from a group consisting of: a notch structure, a tab structure, a ridge structure, and a hook structure.

13. The electronic device enclosure defined in claim 1, wherein the at least one peripheral metal antenna includes an inner portion and an outer portion, wherein the inner portion is attached to the glass cover via an adhesive, and wherein the peripheral side protective member is molded over at least the outer portion.

14. An electronic device comprising:
a glass cover formed on an outer surface of the electronic device;
an antenna adhered directly to a bottom surface of the glass cover by an adhesive layer;
a peripheral side member molded over the antenna; and
a vertical electronic device housing sidewall structure formed around a periphery of the electronic device, wherein the antenna is interposed between a portion of the glass cover and a top surface of the vertical electronic device housing sidewall structure.

15. The electronic device defined in claim 14, wherein the adhesive layer is formed along a peripheral edge of the glass cover and wherein the antenna is secured to the glass cover along the peripheral edge.

16. The electronic device defined in claim 15, wherein the glass cover has four peripheral edges and wherein the adhesive layer is a ring-shaped adhesive layer formed along each of the four peripheral edges of the glass cover.

17. The electronic device defined in claim 16, wherein the peripheral side member comprises a first portion formed around each of the four peripheral edges of the glass cover and a second portion formed along the bottom surface of the glass cover.

18. The electronic device defined in claim 14, wherein the glass cover has four peripheral edges, wherein the antenna has an edge portion and a bottom portion, wherein the edge portion is formed along one of the four peripheral edges of the glass cover, and wherein the bottom portion is secured to the bottom surface of the glass cover by the adhesive layer.

19. The electronic device defined in claim 14 wherein the peripheral side member is secured to the glass cover by the antenna.

20. The electronic device defined in claim 19, wherein the glass cover has four peripheral edges, the electronic device further comprising:
a housing support structure formed around each of the four peripheral edges of the glass cover, wherein the housing support structure is coupled to a bottom surface of the peripheral side member and wherein the glass cover is coupled to a top surface of the peripheral side member.

21. An electronic device having a periphery, comprising:
a cover glass formed on an outer surface of the electronic device;
a peripheral housing structure formed along the periphery of the electronic device;
an antenna interposed between the cover glass and the peripheral housing structure;
a molded side member interposed between the cover glass and the peripheral housing structure; and
an additional antenna interposed between the cover glass and the peripheral housing structure, wherein the additional antenna is located in a common plane with the antenna.

22. The electronic device defined in claim 21, wherein the molded side member is molded over the antenna.

23. The electronic device defined in claim 22, wherein the cover glass has four peripheral edges and wherein the molded side member is molded around each of the four peripheral edges of the cover glass.

24. The electronic device defined in claim 21, wherein the electronic device comprises a cellular telephone.

25. The electronic device defined in claim 14, wherein the antenna is configured to wirelessly communicate with a cellular telephone network.

26. The electronic device enclosure defined in claim 1, wherein the peripheral metal antenna is configured to wirelessly communicate with a Bluetooth network.

27. The electronic device defined in claim 21, wherein the peripheral housing structure has a first surface that is parallel to the cover glass, wherein the molded side member has first and second opposing surfaces and a third surface that extends between the first and second opposing surfaces, wherein the third surface of the molded side member is adjacent to the first surface of the peripheral housing structure, and wherein the third surface of the molded side member is parallel to the cover glass.

* * * * *